US011899700B1

United States Patent
Yoon et al.

(10) Patent No.: US 11,899,700 B1
(45) Date of Patent: Feb. 13, 2024

(54) CATEGORICAL EXPLORATION FACILITATION RESPONSIVE TO BROAD SEARCH QUERIES

(71) Applicant: Amazon Technologies, Inc., Seattle, WA (US)

(72) Inventors: Sungro Yoon, Redmond, WA (US); Soo-Min Pantel, Bellevue, WA (US); Opeyemi Akanji, Bellevue, WA (US); Vivek Kumar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 410 days.

(21) Appl. No.: 17/068,410

(22) Filed: Oct. 12, 2020

Related U.S. Application Data (63) Continuation of application No. 15/926,138, filed on Mar. 20, 2018, now Pat. No. 10,866,976.

(51) Int. Cl.
  *G06F 16/33* (2019.01)
  *G06F 16/28* (2019.01)

(52) U.S. Cl.
  CPC ........ *G06F 16/3334* (2019.01); *G06F 16/288* (2019.01); *G06F 16/3349* (2019.01)

(58) Field of Classification Search
  CPC .. G06F 16/951; G06F 16/338; G06F 16/3329; G06F 16/3346; G06F 16/9535; G06F 16/35; G06F 16/93
  See application file for complete search history.

(56) References Cited

U.S. PATENT DOCUMENTS

| | | | |
|---|---|---|---|
| 6,826,559 B1 | 11/2004 | Ponte | |
| 6,963,867 B2 | 11/2005 | Ford | |
| 7,181,438 B1 | 2/2007 | Szabo | |
| 7,321,892 B2 | 1/2008 | Vadon | |
| 7,620,628 B2 | 11/2009 | Kapur et al. | |
| 7,831,609 B1 | 11/2010 | Alexander | |
| 7,953,740 B1 | 5/2011 | Vadon | |
| 7,970,664 B2* | 6/2011 | Linden ............... | G06Q 30/0256 705/26.7 |
| 8,260,771 B1 | 9/2012 | Ortega et al. | |
| 8,290,941 B2 | 10/2012 | Alexander | |
| 8,370,362 B2 | 2/2013 | Szabo | |

(Continued)

FOREIGN PATENT DOCUMENTS

| WO | WO99/45487 | * | 9/1999 |
|---|---|---|---|
| WO | WO 99/45487 | | 9/1999 |

OTHER PUBLICATIONS

Zeng et al., "Trends and Issues in establishing interoperability among knowledge organization systems", Willey, 2003.*

*Primary Examiner* — Daniel A Kuddus
(74) *Attorney, Agent, or Firm* — Knobbe, Martens, Olson & Bear, LLP (57) ABSTRACT

A search results user interface enables a user conducting a search of an electronic catalog to identify and access browse nodes (item categories) associated with the search query when the search query is determined to be broad. In one embodiment, if the catalog items that are responsive to the search query fall within more than a threshold number of browse nodes, a search results page is presented that provides functionality for the user to view the browse nodes associated with the search query and to navigate to associated browse node pages.

20 Claims, 4 Drawing Sheets

(56) References Cited

U.S. PATENT DOCUMENTS

| | | | | |
|---|---|---|---|---|
| 8,407,105 B2* | 3/2013 | Linden | ............... | G06Q 30/0282 |
| | | | | 705/26.7 |
| 8,433,621 B2* | 4/2013 | Linden | ............... | G06Q 30/0271 |
| | | | | 705/26.7 |
| 8,589,429 B1* | 11/2013 | Thirumalai | ......... | G06F 16/2228 |
| | | | | 707/766 |
| 8,620,767 B2* | 12/2013 | Linden | ................ | G06Q 30/0253 |
| | | | | 705/26.1 |
| 8,738,627 B1* | 5/2014 | Khoshnevisan | ...... | G06F 16/954 |
| | | | | 707/738 |
| 8,751,489 B2 | 6/2014 | Ortega et al. | | |
| 9,753,976 B1* | 9/2017 | Adogla | ............. | G06F 16/24534 |
| 10,706,450 B1* | 7/2020 | Tavernier | ............ | G06F 16/9535 |
| 2003/0195877 A1* | 10/2003 | Ford | ....................... | G06F 16/35 |
| 2005/0222987 A1 | 10/2005 | Vadon | | |
| 2006/0047649 A1 | 3/2006 | Liang | | |
| 2007/0156677 A1* | 7/2007 | Szabo | ................ | G06Q 30/0275 |
| | | | | 707/999.005 |
| 2008/0027933 A1 | 1/2008 | Hussam | | |
| 2008/0077570 A1 | 3/2008 | Tang et al. | | |
| 2010/0332583 A1 | 12/2010 | Szabo | | |
| 2011/0055190 A1 | 3/2011 | Alexander | | |
| 2011/0055192 A1 | 3/2011 | Tang et al. | | |
| 2011/0238525 A1* | 9/2011 | Linden | ................... | G06Q 30/02 |
| | | | | 705/26.7 |
| 2012/0259729 A1* | 10/2012 | Linden | ............... | G06Q 30/0603 |
| | | | | 705/26.7 |
| 2012/0323953 A1 | 12/2012 | Ortega et al. | | |
| 2013/0198030 A1* | 8/2013 | Linden | ............... | G06Q 30/0641 |
| | | | | 705/26.7 |
| 2017/0344622 A1 | 11/2017 | Islam et al. | | |

* cited by examiner

CATEGORICAL EXPLORATION FACILITATION RESPONSIVE TO BROAD SEARCH QUERIES

PRIORITY CLAIM

This application is a continuation of U.S. application Ser. No. 15/926,138, filed Mar. 20, 2018, the disclosure of which is hereby incorporated by reference.

BACKGROUND

The task of navigating or searching a large electronic catalog of items (e.g., a catalog with over one thousand items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

Some web sites and other types of interactive systems implement services for generating customized content suggestions for items stored or represented in a data repository. One common application for such services involves suggesting products for purchase, rental, subscription, viewing, or some other form of consumption. For example, some e-commerce web sites provide services for suggesting products to users based on their respective purchase histories, rental histories, product viewing histories, item ratings, and/or other behaviors. Such services are also used to suggest web sites, news articles, users, music and video files, and other types of items.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to a system that analyzes search queries to determine level of breadth of the search query, for example during an online shopping session or network-based search and browsing session. If a broad search query is identified, the system customizes a search result user interface to facilitate user exploration of categories associated with the search query. This customized user interface can be presented in place of (or in addition to) the typical ranked search results, and can include functionality to enable the user to explore a number of different items in each category. Broad queries can be identified (and distinguished from narrow queries) by having more than a threshold number of categories associated with their keyword strings. As used herein, a "keyword string" refers to a set of characters or terms from a processed search query. The processing of a search query identifies any terms that should be excluded from the described query analysis, with the remainder of the terms used as the keyword string that represents the search query.

Data analysis of searches run through an existing online shopping system log revealed that approximately 14% of the search volume is "broad," that is, includes queries run for an ambiguous target where the user may not have a specific goal item in mind. Examples include users querying with broadly-targeted keyword strings such as "kitchen" or "furniture." Such queries typically have high reformulation and abandonment rates. Reformulation refers to the user sequentially running different permutations of the query, while abandonment refers to the user leaving the system without acquiring an item. This implies that users who issue broad queries are not yet decisive, having no specific items in mind. They repeat and reformulate their query and explore the results until good items are found, or until they finally give up the search. Analysis of this behavior after the broad search indicates that such users may desire to explore a number of different items that have common attributes in order to identify one that they desire. The listing of items typically returned by a search query can be ranked, for example, based upon popularity (among a group of users) or predicted interest to the searching user, and thus tend to include similar items clustered together near the top of the search results. Such a listing does not facilitate the exploratory type of experience that users performing broad search queries typically undertake.

The present disclosure addresses the aforementioned problems, among others, by automatically identifying broad or ambiguous search queries and then proactively guiding users through the item exploration process so that they can more easily make informed purchase decisions and identify a desired item. For example, an electronic catalog can include content arranged in a hierarchical structure, having items (e.g., physical or digital goods, or services) associated with one or more categories or browse nodes in a hierarchy (or graph). A search engine for searching the electronic catalog can build a mapping of search keyword strings to catalog browse nodes based on past search logs, thereby grounding the system's understanding of the meaning of the keyword strings within the context of the catalog. The search engine can then use this mapping to identify broad searches by determining whether greater than a threshold number of browse nodes are associated with the keyword(s) of a search. For identified broad searches, the search engine can then generate an exploration user interface customized for a particular search that includes selectable options to browse items within the browse nodes together with one or more representative items from each browse node. Beneficially, the exploration user interface provides a more browse-like experience than typical search results displays so that the user can narrow down their search more quickly. The exploration user interface further can facilitate user exploration of a number of similar items to assist the user in identifying the item (or items) that they wish to acquire. Further, the disclosed techniques avoid presenting items (and detail pages for items) that are not relevant to the intent behind a broad search, reducing load on the system by eliminating the unnecessary download of information that is not relevant for the user.

Figure 1:
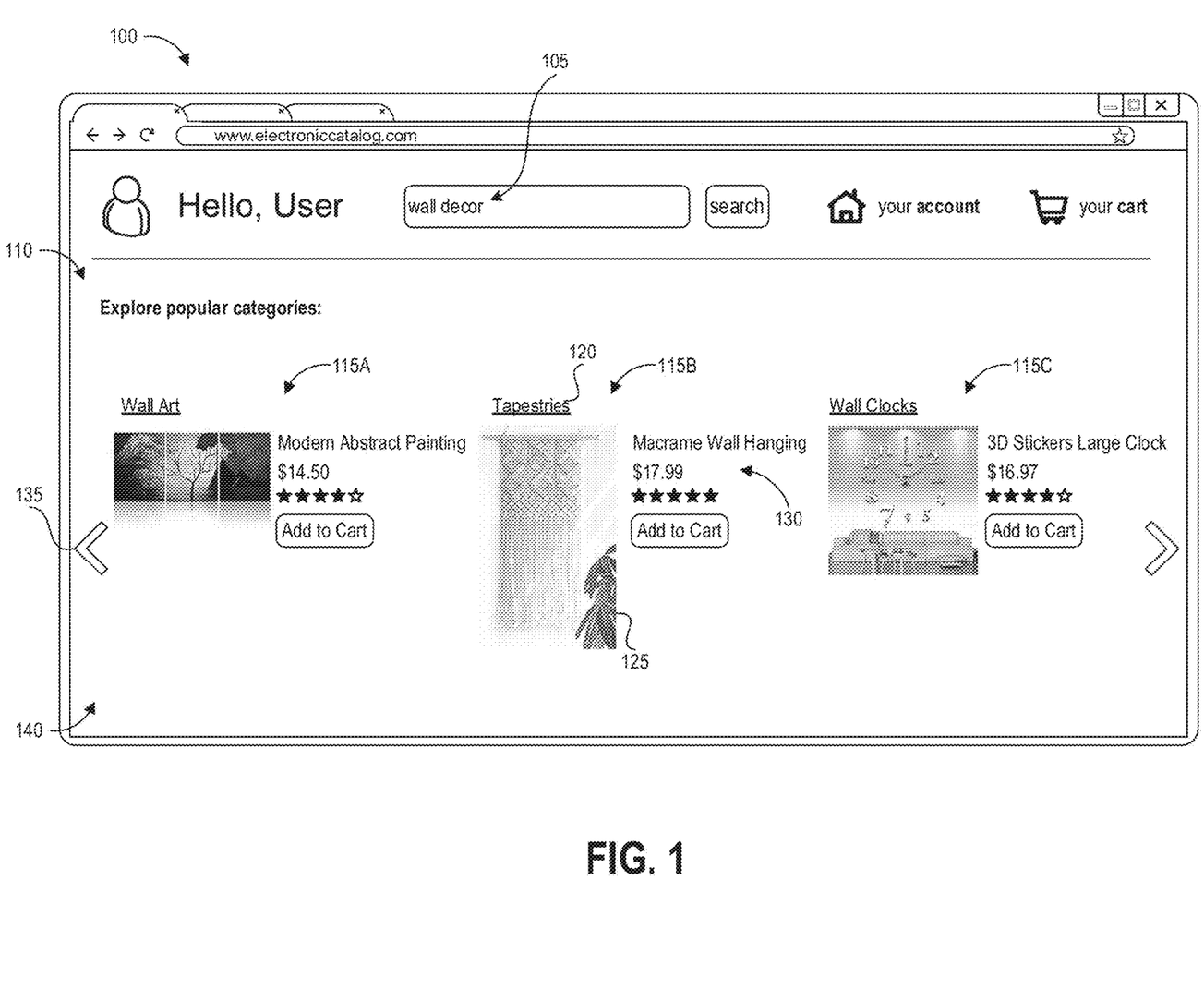
FIG. 1 depicts an example graphical user interface providing recommended categories to browse in response to a broad search query, according to the present disclosure.

To illustrate, FIG. 1 depicts an example user interface 100 displaying browse node exploration sections 115A-115C returned in response to a broad search query 105. In this example, the browse node exploration sections 115A-115C are displayed in an upper region 110 of an area of the user interface 100 that would typically be used to display search results, with carousel navigational features 135 to enable the user to see any additional browse node exploration sections generated as described herein. Search results (e.g., representations of individual items, not illustrated) can be displayed in a lower region 140 of the user interface 100 below the carousel. Other arrangements and navigational elements can be used, for example for displays of different sizes. Although the present example focuses on a graphical user interface, the disclosed techniques can be applied to audibly presented item listings, for example items described using synthesized speech via a home assistant device. As illustrated, the search query 105 is a natural language string of "wall decor." In response to this query 105, the disclosed search engine can automatically detect ambiguity in the query 105, identify relevant browse nodes (e.g., categories of items) and suggest a popular item (or small set of popular items) from each identified browse node. Popularity, as used herein, can refer to item ranking determined based on the number of users who purchase an item, view the detail page of the item, or who perform other item interactions including reviews, ratings, wishlist/registry adds, downloads, and streams.

In the example of FIG. 1, the search engine finds relevant brose nodes, "Wall Art" 115A, "Tapestries" 115B, and "Clocks" 115C based on the keyword strings in the query 105, and selects popular products from each. In this example graphical user interface 100, each browse node exploration section 115A-115C includes a user-selectable option 120 to view a landing page for the browse node, a representative image 125 of the most popular item in that browse node, and information 130 about the item. This landing page can be a new page, for example a second user interface that takes the place of the graphical user interface 100 or is opened in a new browser tab, or can be a new section opened within the user interface 100. Each browse node is determined to be relevant to a possible intent of the broad query based on past search logs and subsequent user behavior, as described in more detail below, thus assisting the user in narrowing down their search. The browse node landing page can display a listing of items associated with the browse node, which can assist the user in locating a desired item. Beneficially, by being presented with a diverse set of category options that are predicted to pertain to the broad query 105, the user can select one of the recommended browse nodes and begin exploration by navigating through a grouping of similar items. On the browse node landing page, for example, the user can look through best sellers or new arrivals in browse node page. This can help the user quickly narrow down to a potential target category of interest without having to revise the search query 105, and from there the user can continue their browsing by navigating similar items.

Search query analysis algorithms and user interfaces of the type disclosed herein allow users to locate items of interest with fewer steps. For example, in the embodiments described herein, when the user is presented with one or more browse node or category recommendations, each item recommendation includes, or is in the form of, a link to the browse node detail page for the corresponding browse node, allowing the user to navigate directly to this page and peruse items of the browse node. Each recommendation thus serves as a programmatically selected navigational shortcut to the item's detail page or description, allowing the user to bypass the navigational structure of the browse tree. Beneficially, programmatically identifying browse nodes or categories items of interest and presenting the user with navigational shortcuts to these pages where they can browse related items can improve the speed of the user's navigation through the electronic catalog, rather than requiring the user to page through multiple other pages in order to locate a set of interesting items to browse via the browse tree. This can be particularly true for computing devices with small screens, where fewer items can be displayed to the user at a time and thus navigation of larger volumes of items is more difficult.

The present disclosure provides certain examples of search queries and associated browse nodes, and of browse nodes and associated popular items. These are intended to illustrate and not limit the scope of the disclosed broad search analysis and user interface generation techniques. Although examples in the present disclosure focus on the context of digital shopping via an electronic catalog, the disclosed search engine can be used to customize browsing experiences outside of the context of an electronic catalog. For example, the disclosed techniques may be useful for identifying news articles, educational resources, web pages/domains, and other digital content that is likely to align with the user intent behind a broad search query. The disclosed methods can also be used to identify categories of restaurants (or specific dishes or types of food), television shows, movies, real estate listings, music, events (e.g., concerts), vacation packages, and various other types of items that may be relevant to a broad search, and to customize user interfaces to facilitate user exploration of the options related to their broad search. Thus, "items" as used herein can refer to products or services represented in a networked environment using a hierarchical data structure, for example products available within an electronic catalog, digital content (e.g., images, downloadable or streamable music and video), news articles, websites, restaurant listings, vacation. As such, the disclosed techniques are not limited to predicting items of interest for a shopping mission of an electronic catalog user, and are applicable in a variety of contexts, particularly where content is arranged in a hierarchical or graph structure having different nodes.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting.

Overview of Example Intent-Aware Machine Learning Processes

Figure 2:
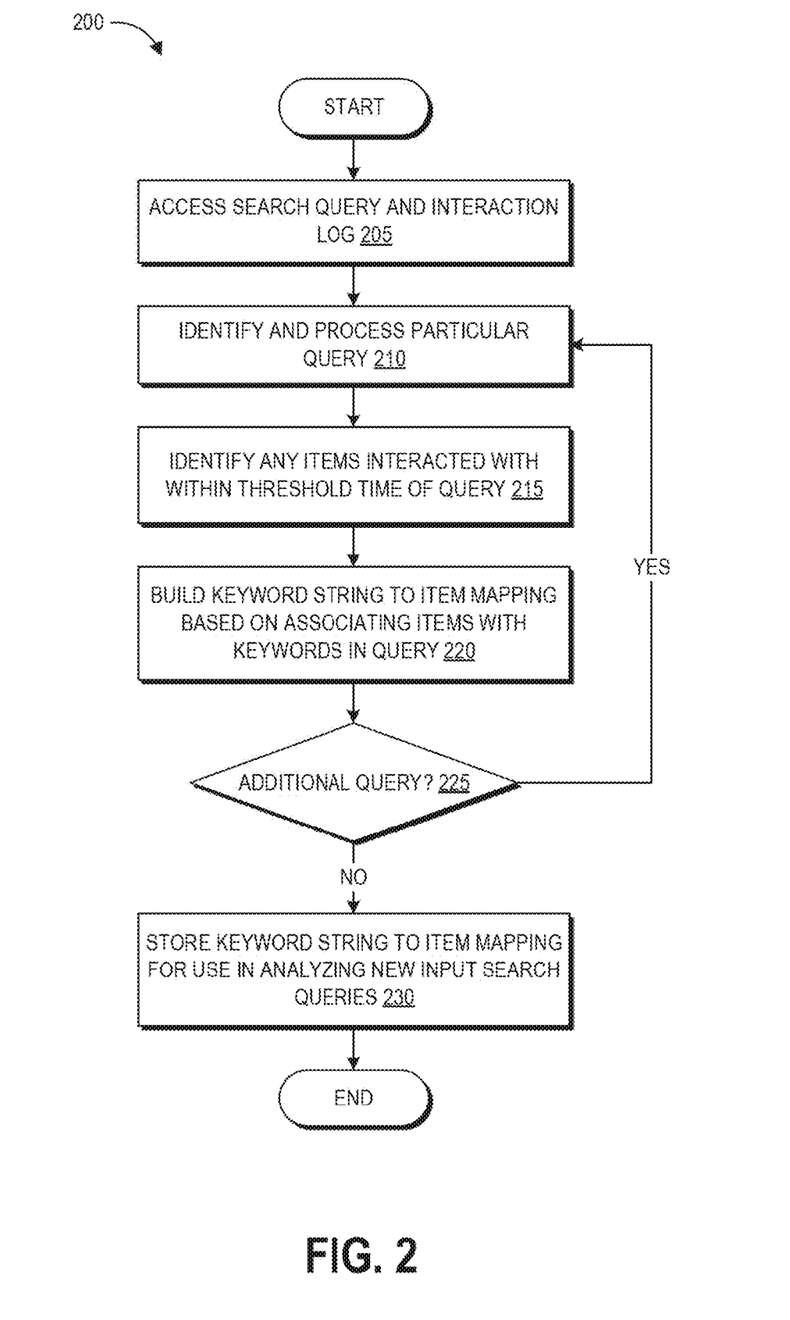
FIG. 2 depicts a flowchart of an example method for constructing a search query keyword to browse node association mapping.

FIG. 2 depicts a flowchart of an example process 200 for building a keyword string to item mapping for use in identifying the breadth of search queries, for example the query 105 of FIG. 1. The process 200 can be implemented by components of the computing system 400 described below, or another suitable computing system. As described further below, the process 200 may be executed periodically (e.g., once per day) or intermittently (e.g., upon collection of a certain quantity of new search log data) in an offline mode.

The process 200 may begin in response to an event, such as on a predetermined or dynamically determined schedule, on demand when initiated by a system administer, or in response to some other event. For example, the process 200 may be executed in an offline mode periodically, for example once per day, month, or in response to some other timing specification. When the process 200 is initiated, a set of executable program instructions stored on one or more non-transitory computer-readable media (e.g., hard drive, flash memory, removable media, etc.) may be loaded into memory (e.g., random access memory or "RAM") of a server or other computing device. The executable instructions may then be executed by a hardware-based computer processor (e.g., a central processing unit or "CPU") of the computing device. In some embodiments, the process 200 or portions thereof may be implemented on multiple computing devices and/or multiple processors, serially or in parallel.

At block 205, the process 200 accesses data regarding search queries and associated user interactions. The interactions can include item purchases, item viewing events (e.g., item detail page visits), wish list adds, shopping cart adds, or and/or types of item-related actions performed by the user within a certain timeframe after performing a query. These actions may be limited to a pre-determined timeframe after running the search, predetermined number of clicks, actions occurring between the search and a subsequent search, or a combination of these. These events are referred to herein as a "predetermined window" after the search. In some examples, this timeframe can be one day. These interactions can still be captured even when there are subsequent searches by the user (and those subsequent searches may trigger their own interaction-capturing period and associated interaction events). Although some users may embark on different shopping missions that are not related to the query, when user interaction data is used in the aggregate on a large scale (e.g., thousands or millions of users), these unrelated interactions do not skew the resulting mapping.

In some embodiments, the interactions may include or be limited to items purchased from displayed search results or related browsed items, as this is a strong positive signal that the item satisfied the intent behind the search query. In other embodiments, the interactions can additionally or alternatively include shopping cart adds that do not result in a purchase, item detail page views, wishlist adds, clickstreams (viewing a sequence of item detail pages), streaming digital media search results. These actions are also considered as a positive vote by the user that the item satisfies their search query.

Although purchases may indicate the strongest positive vote, an example electronic catalog may see around 200 million clicks per day but only a million purchases. Thus, including other positive votes can expand the volume of data available for building the keyword string to item association mapping. Some implementations can use interactions including purchases (and/or other acquisition events) and views, and can weight purchases more heavily than views. A data repository can store search queries and the interaction sets associated with such queries. This data repository can be maintained with user-specific queries and interactions and/or aggregate queries and interactions from a number of users. The same or another data repository can store each item associated with one or more catalog browse nodes.

Although not illustrated, some embodiments of the process 205 can include identifying that a search was performed and capturing subsequent interaction events according to a predefined set of capture rules. In other embodiments, the process 205 may obtain such data from another source.

At block 210, the map builder identifies a particular query and processes it to identify its keyword string. This can include identifying individual words and/or phrases. In some embodiments, certain terms can be ignored or excluded, for example descriptive terms such as color and brand, or words and phrases used for searching in natural language. Any terms that are ignored will not appear in the keyword string to item mapping in the preferred embodiment, and thus would not be used during real-time search query analysis to identify broad searches or to identify browse nodes associated with broad searches. Thus, the keyword string of a given search query is the entire query minus any excluded characters or terms. Further, these terms may undergo natural language processing to correct any grammatical spelling errors, and/or to identify terms for exclusion. A query processed using one or both of these approaches can be referred to as a "processed search query." For example, a user may issue a search query "recommend wall art for me," and the query processing can drop the words "recommend" and "for me." In this example, the keyword string associated with the processed search query "recommend wall art for me" would be "wall art."

At block 215, the map builder identifies any items interacted with in association with submission of the query. For example, some implementations may use a window of time corresponding to one day following the query, and may capture (e.g., keep a record of) any items interacted with during this timeframe and then associate the query with these items. Some implementations can cut this window of time short if another query is issued by the user, such that only items interacted with in the timeframe between the user issuing the queries are associated with the first query, and the second query starts over again regarding being associated with items interacted with during the window of time. Other periods may be used in other implementations, and some implementations may alternatively use a certain number of interactions, or may not use such time periods or interaction number limits. These interactions can include item acquisitions (e.g., purchases, leases/rentals, streams, and downloads), item detail page views, user submissions of questions, comments, or reviews about an item, and user additions of items to wishlists or registries. Some implementations may limit the captured interactions to just one or a subset of these types of interactions, for example only capturing acquisition interactions as this is the strongest positive vote that the item satisfies the user's query.

At block 220, the map builder associates items of these interactions with the keyword strings in the query to build the keyword string to item mapping. This can involve generating or updating a database where a keyword string, or a unique identifier of the keyword string, is stored together with (e.g., in association with) a list of unique identifiers of particular items. To illustrate, returning to the example of FIG. 1, the query 105 of "wall decor" is also the keyword string, and is associated with a list of paintings or clocks that users have actually purchased or viewed using the electronic catalog after issuing that query. The mapping database can include an entry for each keyword string in the corpus of search data used to build the mapping.

Items with more purchases or views can have higher ranks in the list of items associated with a particular keyword string. For example, each item associated with a keyword string can additionally be associated with a counter. For items that are reflected in the captured interactions but not already associated with a particular keyword, these items (or their unique identifiers) may be added to the list for that keyword string. For items that are reflected in the captured interactions and are already associated with a particular keyword, the counter of that item can be incremented to reflect that multiple users interacted with that item after performing a search with that keyword string. In this manner, the search engine generates a mapping reflecting popular items for particular search keyword strings. As such, the mapping is based on past user behavior, and grounds search query keyword strings within the context of the electronic catalog by defining the keyword strings using popular items that users interact with after querying using the keyword strings.

Figure 3:
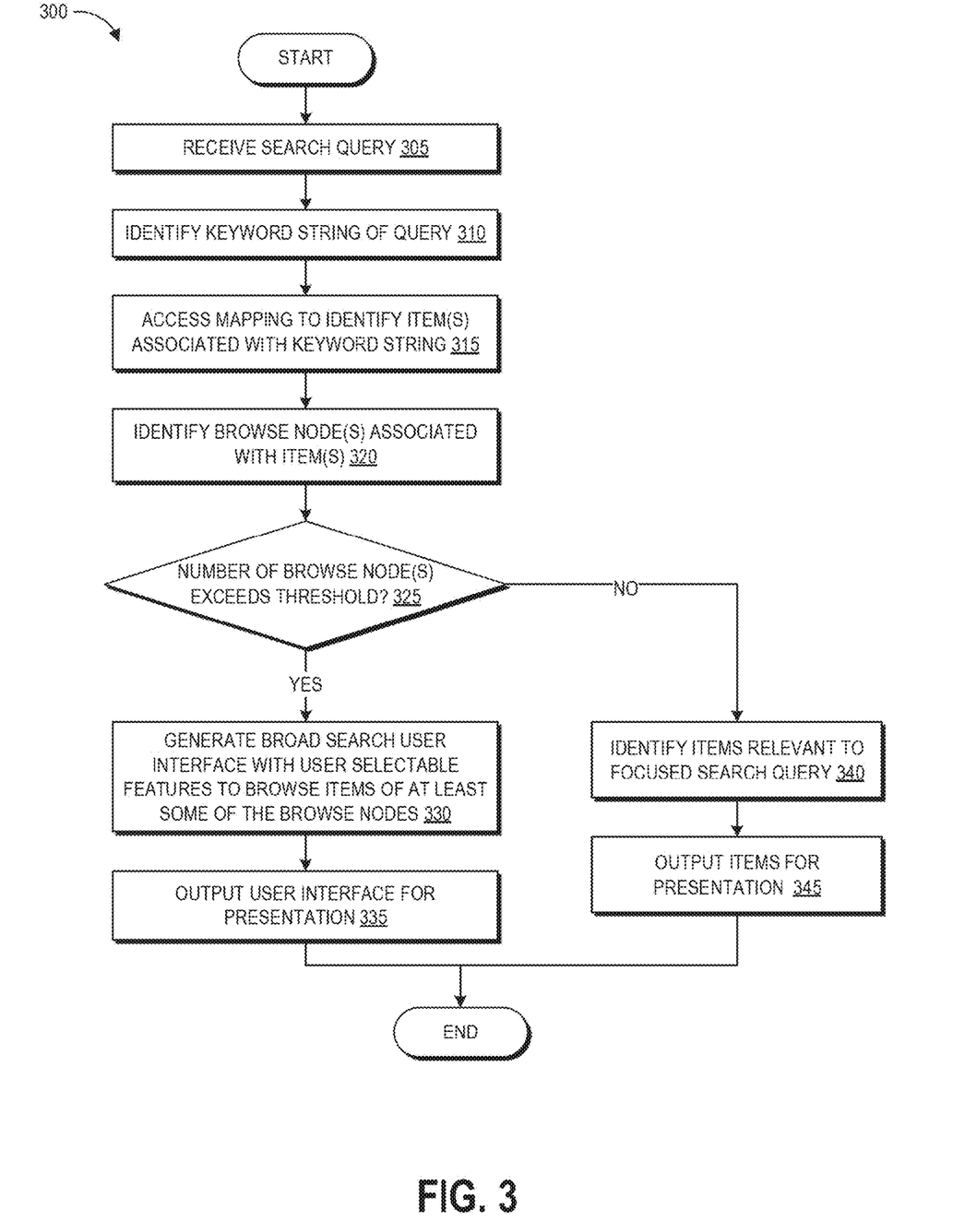
FIG. 3 depicts a flowchart of an example method for generating a graphical user interface providing recommended categories to browse in response to a broad search query, for example the user interface of FIG. 1.

At decision block 225, the map builder determines whether there are additional queries in the search log to use for building or updating the mapping. If so, the process 200 loops back through blocks 210-220 to build or update a list of items associated with the keyword strings of the additional query. This can be repeated for all queries in the search log. When there are no additional queries, the process 200 transitions to block 230 to store the keyword string to item mapping for use in analyzing new input search queries, for example using the process 300 described below.

The process 200 can be performed in an offline mode. As used herein, "offline" or "offline mode" refers to processing operations relating to data and/or calculations that are pre-computed, that is, performed in advance of an event that may trigger output of a broad search user interface as described herein. The search engine may generate the keyword string to item mapping periodically, for example once per day, and may use a sliding window of search log data (e.g., searches and corresponding interactions within the past month). Some embodiments can apply a time decay, however in certain scenarios this may overweight trends and thus no time decay may be used. The mapping can then later be used to generate recommendations for users as they interact with the electronic catalog.

Figure 4:
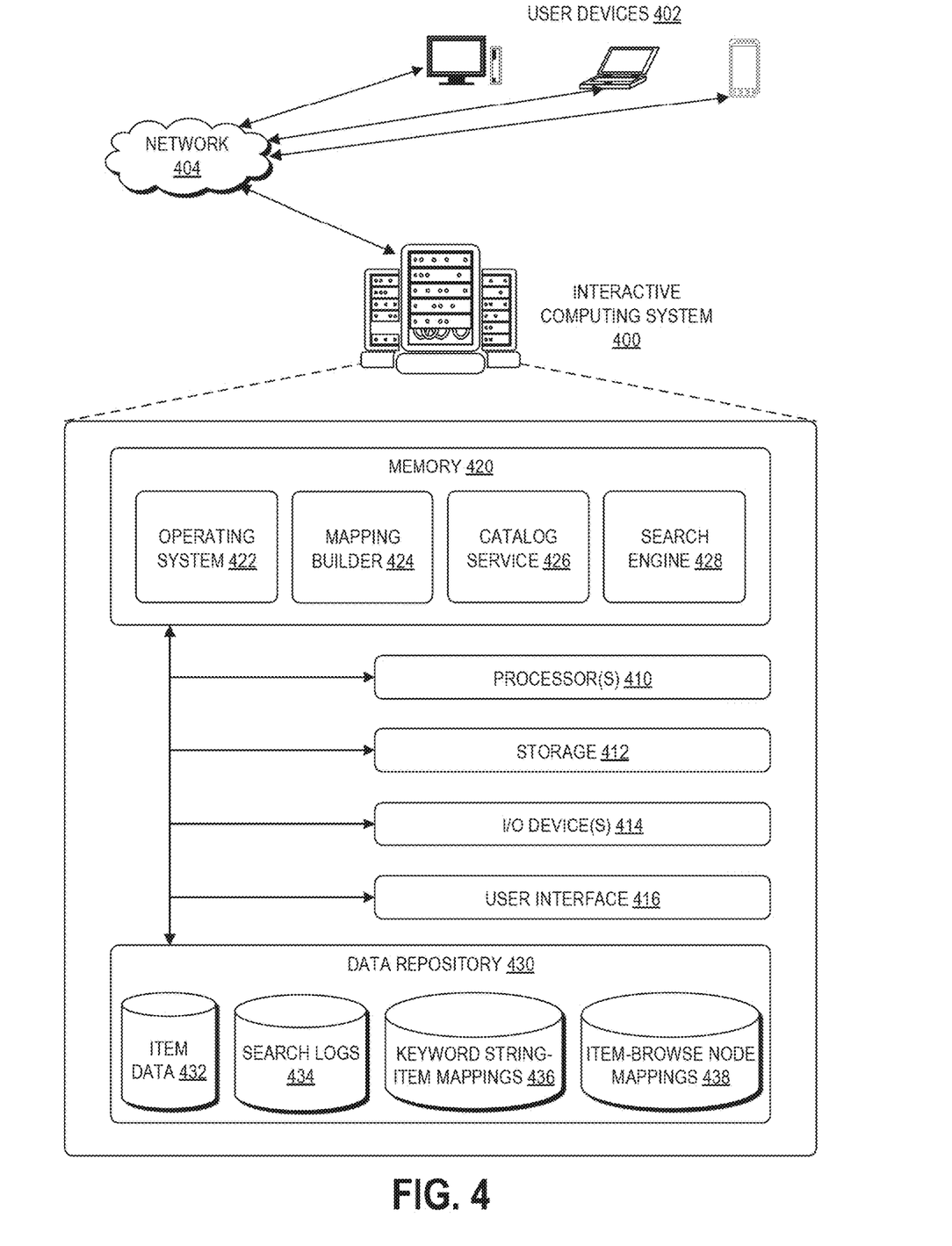
FIG. 4 is a block diagram of an illustrative computing system configured to implement the processes of FIGS. 2 and 3 to generate a user interface, for example the user interface of FIG. 1.

FIG. 3 depicts a flowchart of an example method 300 for generating a graphical user interface providing recommended categories to browse in response to a broad search query, for example the user interface 100 of FIG. 1. The process 300 can be implemented by components of the interactive computing system 400 described below. When the process 300 is initiated, a set of executable program instructions stored on one or more non-transitory computer-readable media may be loaded into memory of a server or other computing device. The executable instructions may then be executed by a hardware-based computer processor of the computing device. In some embodiments, the process 300 or portions thereof may be implemented on multiple computing devices and/or multiple processors, serially or in parallel.

At block 305, the process 300 begins in response to receiving an input search query from a user, for example through a search engine of an electronic catalog service. At block 310, the search engine identifies the keyword string represented by the query. As described above, the keyword strings can be individual words or phrases of multiple words that occurred sequentially or non-sequentially in the original search query (e.g., by having some words excluded), and may represent the product of natural language processing or other keyword-exclusion processing performed on the search query.

Next, at block 315 the search engine accesses the keyword string to item mapping generated, for example, using the process 200 described above. The search engine can look up the keyword strings in the mapping to identify any items associated with the keyword strings. In some implementations, the search engine may only consider the most popular items associated with the keyword (e.g., 1, 5, or 10 most popular items by interaction count, or all items having greater than a threshold count).

At block 320, the search engine identifies the total number of different browse nodes associated with the items identified at block 315. For example, the search engine can extract the categories of each item, for example by accessing an item to category mapping table that maps each item to one or more associated categories. In the electronic catalog context, among others, this mapping can use hierarchical browse nodes that classify items, and thus may be considered an item to browse node mapping. Since the category/browse node of a given item does not typically change, the system can build this data set infrequently, for example to accommodate newly released items. For example, a specific item "clock XYZ" is mapped to the category "Clocks" that it belongs to. The disclosed system thus collects a list of frequently referenced browse nodes based on analyzing the search log in conjunction with particular query terms. In some implementations, the list of browse nodes may be filtered to exclude certain browse nodes. For example, one implementation may reference the list of browse nodes against a blacklist of browse nodes that have been identified as undesirable to expose in the browse node exploration user interface (e.g., browse nodes of items with any explicit language or content).

At decision block 325, the search engine uses the number of browse nodes to determine whether the query was a broad query or a focused query. This can involve comparing the number to a threshold, for example three (or more in various implementations). To illustrate, consider that they keyword(s) of a given query are associated with items "a1", "a2", and "b", and that there are two total different categories for the products "a1", "a2", and "b" as they belong to categories "A", "A", "B", respectively. As another illustrative example, testing of the disclosed system found eight different browse nodes for the search query keyword string "kitchen," but only two for "wall clock." In implementations where the number 3 is used as threshold, "kitchen" qualifies as a broad search keyword string while "wall clock" does not.

If at block 325 the total number of distinct browse nodes exceeds the predefined threshold, the search engine determines that the user has a broad intent, and the process 300 transitions to block 330. At block 330, the system generates a broad search user interface, for example the user interface 100 of FIG. 1. The broad search user interface includes browse node exploration sections that include user-selectable functionality to browse items of at least some of the identified browse nodes, together with a popular item for each browse node in the interface. Some implementations can prioritize or rank the categories for display based on the strength of their association with search key (strength of popularity, number of views/clicks of items in that category). In some scenarios, identification of particular words in a search query can trigger a special set of browse node filtering or sorting rules. For example, if the search query relates to apparel, this can trigger browse node sorting rules that sort browse nodes by brand, apparel item type, color, or other apparel-related attributes.

Some implementations of block 330 may cap the number of displayed browse node exploration sections, for example based on a predetermined number (e.g., 9) or based on parameters of the requesting device (e.g., display size, a portion of the display to be used for presenting search results). In such implementations, browse nodes having the most popular items can be included, or browse nodes commonly associated with the greatest number of items associated with the keyword strings can be included.

At block 335, the process 300 outputs the user interface to the requesting user device for presentation, and the process 300 ends. Thereafter, the user selecting one of the browse nodes can redirect the user to a listing of "search results" redefined based on the browse node category, where only those items falling within the selected browse node/category are presented.

Alternatively, if at block 325 the total number of distinct browse nodes does not exceed the predefined threshold, the search engine determines that the user has a focused intent, and the process 300 transitions to block 340. At block 340, the search engine can identify items relevant to the focused search query using suitable existing methods. At block 345, the search engine can output a representation of at least some of these items to the requesting user device for presentation, and the process 300 ends.

The process 300 is performed in an online mode. As used herein, "online" or "online mode" refers to processing operations performed as a user is currently interacting with a networked system such as an electronic catalog. The generated user interfaces can be provided to users in "real time." For example, a user interface provided in real time can be generated and then displayed to a user as the user is interacting with the electronic catalog, such as when the user submits their search query.

Execution Environment

FIG. 4 is a block diagram of an illustrative computing system 400 configured to implement the processes of FIGS. 2 and 3 to generate a user interface, for example the user interface 100 of FIG. 1. The architecture of the interactive computing system 400 includes a memory 420 in communication with a processor 410, which can be in direct communication with one another or distributed among computing devices within a networked computing system and in communication with each other. Components used for the architecture may depend at least in part upon the type of network and/or environment selected.

As depicted interactive computing system 400 may include one or more computers, perhaps arranged in a cluster of servers or as a server farm. The memory and processors that make up these computers may be located within one computer or distributed throughout many computers (including computers that are remote from one another) as detailed herein. These servers may be configured to train artificially intelligent machine learning models to perceive user intent and manage user interface generation to comport with the perceived intent. For example, the interactive computing system 400 may be configured to manage user interfaces displayed in connection with an electronic marketplace.

The interactive computing system 400 may include at least one memory 420 and one or more processing units (or processor(s)) 410. The memory 420 may include more than one memory and may be distributed throughout the interactive computing system 400. The memory 420 may store program instructions that are loadable and executable on the processor(s) 410 as well as data generated during the execution of these programs. Depending on the configuration and type of memory, the memory 420 may be volatile (such as RAM and/or non-volatile (such as read-only memory ("ROM"), flash memory, or other memory). In some examples, the memory 420 may include multiple different types of memory, such as static random access memory ("SRAM"), dynamic random access memory ("DRAM"), or ROM.

The memory can store the program instructions as a number of modules that configure processor(s) 410 to perform the various functions described herein, for example operating system 422, mapping builder 424, catalog service 426, and search engine 428. The memory 420 may include operating system 422 for interacting with the interactive computing system 400.

The mapping builder 424 can analyze search logs to generate keyword string to item mappings. One example technique for generating such a mapping is described above with respect to FIG. 2. The mapping builder 424 can also build item to category or browse node mappings, for example based on user input when new items are added to the system 400. The search engine 428 can search the catalog responsive to queries, for example using the process 300 of FIG. 3 to discern broad searches from narrow searches, and to generate broad search user interfaces including browse node exploration options.

Users can browse an electronic catalog provided by the catalog service 426 or query the search engine 428 to obtain information about electronic catalog content stored in an item data repository 432. In one embodiment, these items can include items other than (or in addition to) applications, such as media (books, audio, video, etc.), clothes, electronics, and appliances, to name a few. The electronic catalog content can include detailed information about these products as well as services. In one embodiment, this content is arranged in a hierarchical structure, having items associated with one or more categories or browse nodes in a hierarchy (or graph). The disclosed attributes associated with search queries can be these catalog fields. The catalog service 426 can provide functionality for users to browse the item hierarchy in addition to searching the catalog. Users can select an item represented in the hierarchy or in a list of search results to see more details about an item. In response to a user item selection, the interactive computing system 400 can provide to a user system 402 a catalog page (sometimes called an item detail page) that includes details about the selected item.

The processor 410 includes one or more general purpose computers, dedicated microprocessors, graphics processors, or other processing devices capable of communicating electronic information. Examples of the processor 410 include one or more application-specific integrated circuits ("ASICs"), for example ASICs purpose built for machine learning training and/or inference, field programmable gate arrays ("FPGAs"), digital signal processors ("DSPs") and any other suitable specific or general purpose processors. The processor 410 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 400 may also include additional storage 412, which may include removable storage and/or non-removable storage. The additional storage 412 may include, but is not limited to, magnetic storage, optical disks, and/or tape storage. The disk drives and their associated computer-readable media may provide non-volatile storage of computer-readable instructions, data structures, program modules, and other data for the computing devices. The memory 420 and the additional storage 412, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 400 may also include input/output (I/O) device(s) and/or ports 414, such as for enabling connection with a keyboard, a mouse, a pen, a voice input device, a touch input device, a display, speakers, a printer, or other I/O device.

The interactive computing system 400 may also include a user interface 416. The user interface 416 may be provided over the network 404 to user devices 402 and utilized by a user to access portions of the interactive computing system 400. In some examples, the user interface 416 may include a graphical user interface, web-based applications, programmatic interfaces such as application programming interfaces ("APIs"), or other user interface configurations. The user interface 416 can be modified as described herein to reflect awareness of broad searches and to provide selectable options to facilitate user exploration of categories of items related to their broad searches.

The interactive computing system 400 may also include a data store 430. In some examples, the data store 430 may include one or more data stores, databases, data structures, or the like for storing and/or retaining information associated with the interactive computing system 400. Thus, the data store 430 may include data structures, such as an item data repository 432, search logs data repository 434, keyword string to item mappings 436, and item to browse node mappings 438.

The item data repository 432 comprises one or more physical data storage devices that stores data representing the items, including the items being considered for recommendation. In the context of the electronic catalog, item data can include names, images, brands, prices, descriptions, user reviews (textual or numerical ratings), category/subcategory within a hierarchy of browsable categories of the electronic catalog, high-level category within a general ledger of the electronic catalog, particular services or subscriptions for which the item qualifies, and any metadata associated with specific items of the catalog. The item data repository 432 also stores data representing item attributes. Item attributes represent characteristics of these items, for example category (or another node in the item hierarchy), brand, gender (e.g., whether the item is typically considered as suitable by males, females, or gender-neutral), target age-range (e.g., baby, child, adult), price, keyword strings, user ratings, delivery timeframe, product origin, and other item attributes presented herein, to name a few non-limiting examples.

The catalog service 426 can access electronic catalog or other item data from item data repository 432. The item data repository 432 can store the items in association with one or more nodes in a hierarchical catalog structure, with a general "items" (e.g., all products) root-level browse node category and more detailed child and descendant browse node categories. Some or all of the items may be associated with one or more categories. In particular, an item can be associated with a leaf-node category, which may be most specific to that item. In turn, this leaf-node category may be part of a broader category (e.g., is connected by an edge to a broader category node), which is in turn part of a broader category still, and so on, up and until the root node. While the terms "browse node," "browse category," and "category" are often used interchangeably herein, it should be understood that categories can be arranged in a flat structure instead of a hierarchical structure in some embodiments.

The search logs data repository 434 comprises one or more physical data storage devices that stores logged user behaviors with respect to representations of items within a network environment ("item interactions") together with associated search queries and/or time data for the events. Interactions can also include user selection of catalog browse nodes and/or search refinement options, and item attribute value selections/inputs. Each of the item interactions and associated time or query data may be stored in, and maintained by, the search logs data repository 434 with respect to a timeline for a particular user or aggregate group of users. Portions of these timelines can be associated with particular search queries as described herein. Item user interaction data repository 434 can, for example in the ecommerce context, include item purchase histories, item viewing histories, item add histories (for example adding an item to a cart without subsequently purchasing the item or adding the item to a wish list or registry), item sharing, item ratings, item reviews, and the like. Outside of the ecommerce context an item can be a network page or web site visited by a user, a digital advertisement selected by a user, or other types of interactive digital content. In some embodiments, an item interaction event may include an identifier for the item (for example, an item number, stock keeping unit (SKU), etc.), an indication of the type of interaction, or any other suitable information.

The keyword string to item mappings data repository 436 comprises one or more physical data storage devices that stores associations between search query keyword strings and particular items, for example as described above with respect to FIG. 2. The item to browse node mappings data repository 438 comprises one or more physical data storage devices that stores the browse nodes associated with particular items, for example as described above with respect to FIG. 3.

The interactive computing system 400 can communicate over network 404 with user devices 402. The network 404 can include any appropriate network, including an intranet, the Internet, a cellular network, a local area network or any other such network or combination thereof. User devices 402 can include any network-equipped computing device, for example desktop computers, laptops, smartphones, tablets, e-readers, gaming consoles, and the like. Users can access the interactive computing system 400 and interact with items therein via the network 404 and can be provided with recommendations via the network 404.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially. Certain described tasks may be implemented by processors that are remote from one another, for example in separate server towers and/or geographically remote. All of the data elements described herein as generated or learned by the system can be stored by the system in volatile or non-volatile computer memory (e.g., solid state memories or disk drive memory).

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a DSP, an ASIC, a FPGA or other programmable logic device, discrete gate or transistor logic, discrete hardware components, or any combination thereof designed to perform the functions described herein. A general purpose processor device can be a microprocessor, but in the alternative, the processor device can be a controller or microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing system comprising one or more hardware processors, the computing system programmed with executable instructions to respond to a submission, from a user device, of a search query by performing a process that comprises:
   identifying a plurality of catalog items that are responsive to the search query;
   identifying one or more catalog browse nodes corresponding to the catalog items that are responsive to the search query;
   determining whether the number of the identified catalog browse nodes exceeds a threshold, said number representing a breadth of the search query, wherein the threshold is at least three; and generating, and outputting to the user device in response to the search query, a search results user interface that displays search query results, wherein generating the search results user interface comprises:

when the number of the identified catalog browse nodes exceeds the threshold, incorporating into the search results user interface a plurality of browse node exploration sections, each browse node exploration section corresponding to a respective one of the identified catalog browse nodes and including (1) a user selectable link to a browse node page corresponding to the respective catalog browse node, and (2) a display of one or more representative items from the respective catalog browse node; and when the number of the identified catalog browse nodes does not exceed the threshold, generating the search results user interface without inclusion of any of said browse node exploration sections.

2. The computing system of claim 1, wherein the executable instructions are configured to incorporate the browse node exploration sections into an interactive carousel of the search results user interface, the interactive carousel comprising controls for exposing browse node exploration sections that are not currently displayed.

3. The computing system of claim 1, wherein generating the search results user interface when the number of the identified catalog browse nodes exceeds the threshold further comprises incorporating into the search results user interface a listing of at least some of the catalog items that are responsive to the search query.

4. The computing system of claim 3, wherein said listing is positioned in the user interface below an interactive carousel that displays the browse node exploration sections.

5. The computing system of claim 1, wherein identifying the catalog items that are responsive to the search query comprises accessing a mapping that maps keyword strings to catalog items, said mapping generated based at least partly on catalog interactions of users who have submitted said search query.

6. The computing system of claim 1, wherein the threshold is three.

7. A computer-implemented method performed under control of program instructions executed by one or more computing devices, the method comprising:

receiving a search query submitted by a user device;

identifying a plurality of catalog items that are responsive to the search query;

identifying one or more catalog browse nodes corresponding to the catalog items that are responsive to the search query;

determining whether the number of the identified catalog browse nodes exceeds a threshold, said number representing a breadth of the search query, wherein the threshold is at least three; and generating, and outputting to the user device in response to the search query, a search results user interface that displays search query results, wherein generating the search results user interface comprises, in response to determining that the number of the identified catalog browse nodes exceeds the threshold, incorporating into the search results user interface a plurality of browse node exploration sections, each browse node exploration section corresponding to a respective one of the identified catalog browse nodes and including (1) a user selectable link to a browse node page corresponding to the respective catalog browse node, and (2) a display of one or more representative items from the respective catalog browse node.

8. The method of claim 7, wherein generating the search results user interface further comprises incorporating the browse node exploration sections into an interactive carousel of the search results user interface, the interactive carousel comprising controls for exposing browse node exploration sections that are not currently displayed.

9. The method of claim 7, wherein generating the search results user interface further comprises incorporating into the search results user interface a listing of at least some of the catalog items that are responsive to the search query.

10. The method of claim 9, wherein said listing is positioned in the user interface below an interactive carousel that displays the browse node exploration sections.

11. The method of claim 7, wherein identifying the catalog items that are responsive to the search query comprises accessing a mapping that maps keyword strings to catalog items, said mapping generated based at least partly on catalog interactions of users who have submitted said search query.

12. The method of claim 7, wherein the threshold is three.

13. Non-transitory computer storage which stores executable program instructions that direct a computing system to respond to a submission, from a user device, of a search query by at least:

identifying catalog items that are responsive to the search query;

identifying item categories corresponding to the catalog items that are responsive to the search query;

determining whether a search query breadth condition is satisfied; and generating, and outputting to the user device in response to the search query, a search results user interface, wherein generating the search results user interface comprises, in response to the search query breadth condition being satisfied, incorporating into the search results user interface a plurality of category exploration sections, each category exploration section corresponding to a respective one of the identified item categories and including a user selectable link to a category page corresponding to the respective item category.

14. The non-transitory computer storage of claim 13, wherein each category exploration section includes a display of one or more representative items from the respective item category.

15. The non-transitory computer storage of claim 13, wherein the executable instructions direct the computing system to incorporate the category exploration sections into an interactive carousel of the search results user interface, the interactive carousel comprising controls for exposing category exploration sections that are not currently displayed.

16. The non-transitory computer storage of claim 13, wherein the executable instructions direct the computing system to incorporate into the search results user interface a listing of at least some of the catalog items that are responsive to the search query.

17. The non-transitory computer storage of claim 16, wherein the executable instructions direct the computing system to incorporate said listing into the user interface below an interactive carousel that displays the browse node exploration sections.

18. The non-transitory computer storage of claim 13, wherein the executable instructions direct the computing system to identify the catalog items that are responsive to the search query at least partly by accessing a mapping that maps keyword strings to catalog items, said mapping generated based at least partly on catalog interactions of users who have submitted said search query.

19. The non-transitory computer storage of claim 13, wherein the executable instructions direct the computing system to determine whether the condition is satisfied by comparing a number of said identified item categories to a threshold.

20. The non-transitory computer storage of claim 19, wherein the threshold is at least three.

* * * * *